No. 742,095. PATENTED OCT. 20, 1903.
J. KLEIN.
CREAM SEPARATOR AND CHURN.
APPLICATION FILED MAY 20, 1903.
NO MODEL. 2 SHEETS—SHEET 1.

Witnesses
Inventor
Joseph Klein
By Jas. J. Sheehy
Attorney

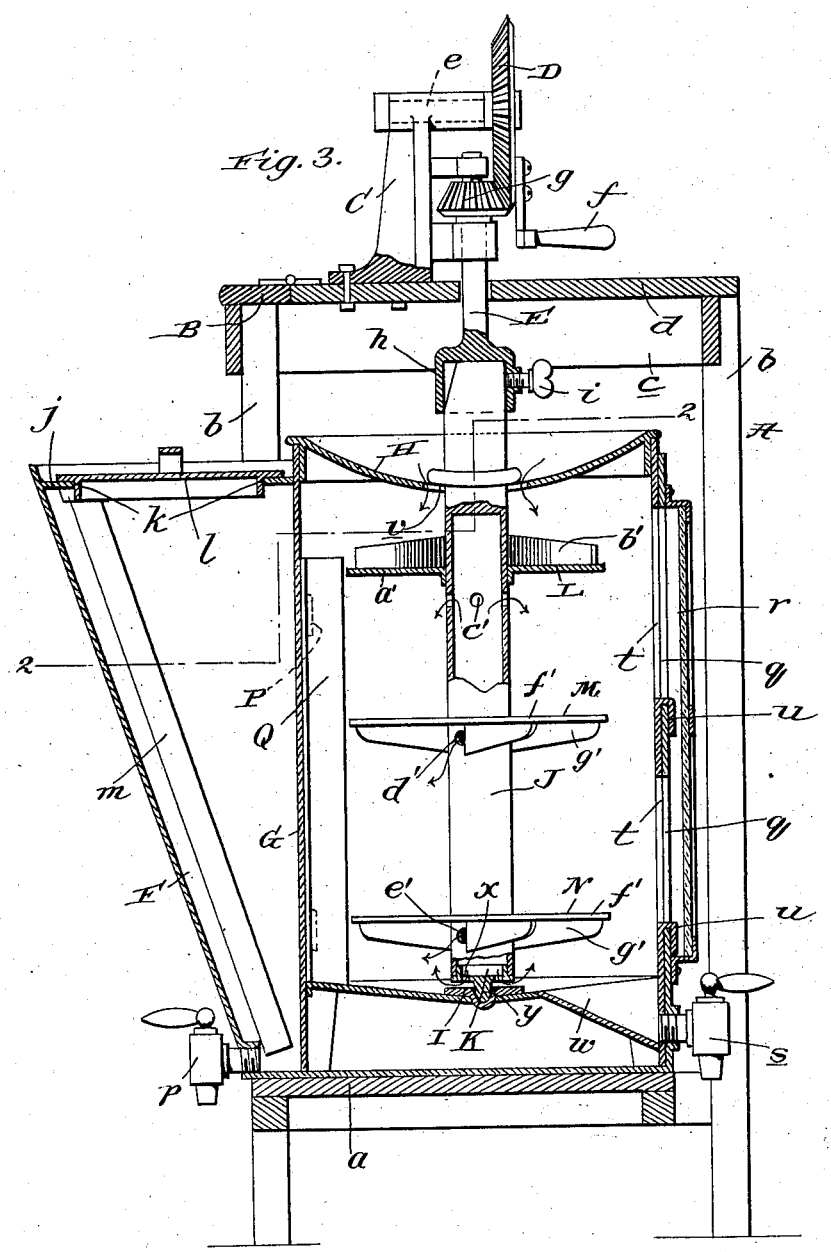

No. 742,095. Patented October 20, 1903.

UNITED STATES PATENT OFFICE.

JOSEPH KLEIN, OF CASS CITY, MICHIGAN.

CREAM SEPARATOR AND CHURN.

SPECIFICATION forming part of Letters Patent No. 742,095, dated October 20, 1903.

Application filed May 20, 1903. Serial No. 157,991. (No model.)

*To all whom it may concern:*

Be it known that I, JOSEPH KLEIN, a citizen of the United States, residing at Cass City, in the county of Tuscola and State of Michigan, have invented new and useful Improvements in Cream Separators and Churns, of which the following is a specification.

My invention relates to cream separating and churning apparatus; and it consists in the peculiar and advantageous construction hereinafter described, and particularly pointed out in the claims appended.

Figure 1:
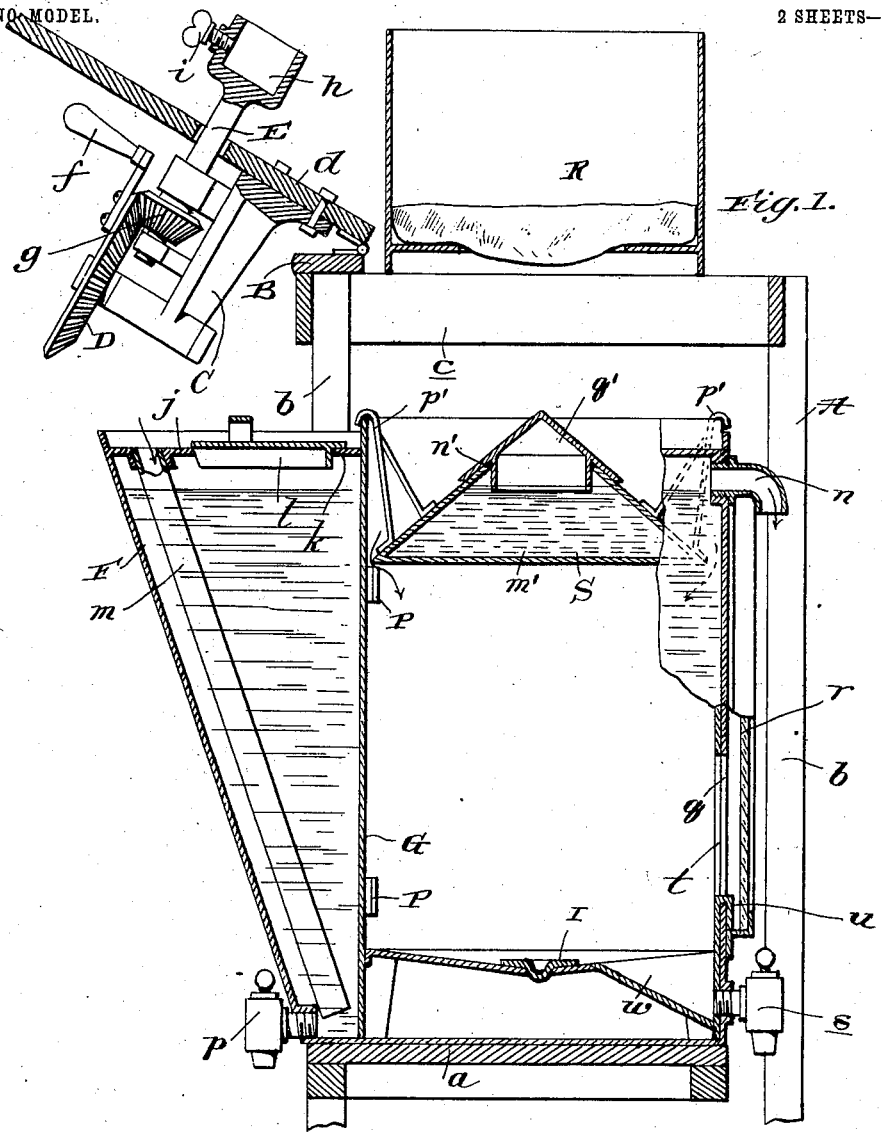
Figure 2:
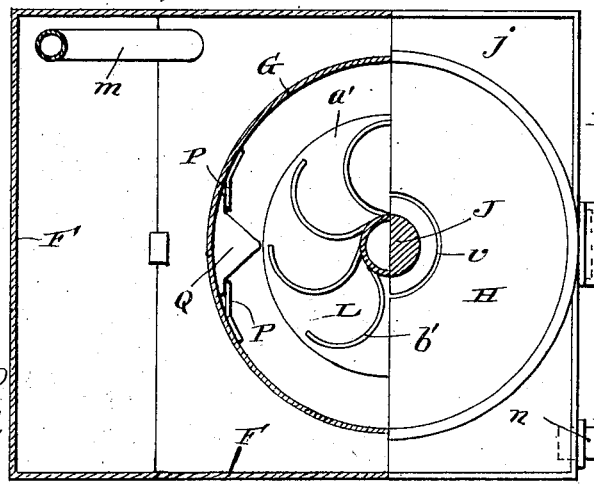

In the accompanying drawings, Figure 1 is a vertical section of my improved apparatus as it appears when used to cool milk precedent to the separation of cream. Fig. 2 is a horizontal section taken on the broken line 2 2 of Fig. 3, and Fig. 3 is a vertical section of the apparatus as it appears when used to separate cream from milk or to churn cream.

Similar letters designate corresponding parts in all of the views of the drawings, referring to which—

A is the main frame of the separator and churn. This frame in the present and preferred embodiment of my invention comprises a base $a$, corner-uprights $b$, and upper horizontal bars $c$, and it is surmounted by a top B, having a leaf $d$ hinged in such manner as to permit of it being raised and lowered.

C is a standard connected to and rising from the leaf $d$ of cover B, D a miter-gear having a journal $e$ bearing in the standard and also having a handle $f$, and E a shaft journaled in bearings on the standard C and extending through an opening in the leaf $d$ and having a pinion $g$ at its upper end intermeshed with the gear D and a socket $h$ and set-screw $i$ at its lower end.

F is a tank, preferably of galvanized iron, arranged on the base $a$ of the main frame. This tank is provided with a top wall $j$, having an opening $k$ and a removable cover $l$, and it is also provided by preference with a water-inlet pipe $m$, which extends from the wall $j$ to a point adjacent to its bottom, a discharge-pipe $n$, which leads from its upper portion, and a draw-off cock $p$. Said tank is further provided with openings $q$ in its side wall and a sight-glass $r$, arranged over said openings.

G is a milk-receptacle, preferably of heavy tin, arranged in the tank F and extending through an opening in the top $j$ thereof. This receptacle is provided with a draw-off cock $s$, openings $t$, which register with the openings $q$ of the tank, and flanges $u$, Fig. 3, which rest over the lower walls of said openings $q$. It is also provided with a removable cover H, preferably concavo-convex, arranged with its convex side down and having a central aperture $v$. The bottom of the receptacle is concave and is provided with a channel $w$, which extends downwardly from a point adjacent to its center to the draw-off cock $s$—this in order to permit of all of the contents of the receptacle being removed through said cock $s$.

I is a central cup-shaped bearing, preferably of cast metal, arranged on the bottom of the receptacle G; J, a hollow shaft, preferably of sheet metal, which extends loosely through the opening in cover H, so that a space is afforded between it and the wall of the opening for the passage of air into the receptacle G, and K a cast-metal base secured in the lower end of the shaft J and having openings $x$ for the passage of air, and a trunnion $y$, removably arranged in the bearing I. The shaft is provided immediately below the cover H with a dasher L, made up of a flat horizontal disk $a'$ and vertical curvilinear blades $b'$, Fig. 2, arranged on the disk. Said shaft is also provided at intermediate points of its height with apertures $c'$, $d'$, and $e'$ and adjacent to the apertures $d'$ and $e'$ with dashers M N. These dashers respectively comprise a flat horizontal disk $f'$, disposed slightly above the apertures, and vertical curvilinear blades $g'$, arranged below the disk.

It will be appreciated from the foregoing that when the set-screw $i$ is loosened the leaf $d$ may be swung upwardly toward the left to carry the shaft E out of engagement with the dasher-shaft J, also that when the leaf and the parts carried thereby are in the position shown in Fig. 1 the cover H and the dasher-shaft J and dashers thereon may be readily removed from the receptacle G and as readily replaced therein.

P P, Fig 2, are guides connected to the side wall of the receptacle G and arranged within the same; Q, a vertical bar, preferably of triangle form in cross-sections, removably arranged between and held by the guides P; R, Fig. 1, a strainer removably arranged on the frame A above the receptacle, and S a milk-cooler, preferably of heavy tin. The said cooler comprises a hollow cone-shaped body $m'$, having an opening $n'$ in its top and also having arms $p'$ with hooks at their upper ends, through the medium of which it is hung from the upper end of the receptacle G, Fig. 1, and a cone-shaped cap $q'$, having a depending flange removably arranged in the opening of the body.

In using my improved apparatus as a cream-separator the tank F and cooler S are filled with water or other suitable cooling agent and the cooler is placed in the receptacle G and the strainer R on the frame A above the cooler, as shown in Fig. 1. Milk is then poured into the strainer, from whence it will pass down over the cooler S and into the receptacle G. Because of the cone shape of the body of the cooler a large cooling-surface is presented to the milk as it passes from the strainer to the receptacle G, and the milk is materially cooled. After the milk is placed in receptacle G, as stated, the strainer R and cooler S are removed, the shaft J, bearing the dashers, is placed in the receptacle G, and the shaft E is returned to the position shown in Fig. 3 and connected to the shaft J. The said shaft J is then turned through the medium of the gearing described for about one and one-half minutes, when the dashers L, M, and N will serve to thoroughly agitate the milk. The dasher L will also serve to draw atmospheric air into the can through the space between shaft J and cover H, while the dashers M N will perform the additional function of drawing such air into the shaft through the apertures $c'$ and down through the shaft and the apertures $d'$ $e'$ into the milk. A portion of the air will also be forced through the apertures $x$ on the shaft-base K and into the milk, with the result that the milk will be aerated and cooled and the separation of the cream accelerated. When the water supplied to the tank is not cold and there is no ice at hand, a portion of the water is removed from the tank at intervals and replaced with fresh water. After the agitation and aeration of the milk the dasher-shaft is removed from receptacle G and the contents of the receptacle are let stand for about three hours, when the cream will be separated from the milk.

The bar Q is not used in the cream-separating operation. When, however, the apparatus is to be used as a churn, the said bar is placed in the receptacle, as shown in Figs. 2 and 3. Cream is then poured into the receptacle and the shaft J is placed therein and connected with and rotated through the medium of the gearing described. When the shaft J is rotated as stated, the cream will be agitated and aerated and cooled; also, the cream will be thrown by the dashers against the bar Q, which constitutes an abutment, and in consequence butter will be quickly produced.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention.

Having described my invention, what I claim, and desire to secure by Letters Patent, is—

1. In an apparatus for the purpose described, the combination of a tank adapted to contain a cooling agent, and having an opening in its side wall, and a sight-glass arranged over said opening, and a receptacle arranged in the tank, and having an opening in its side wall, registered with that of the tank, and a flange resting over the lower wall of said opening of the tank.

2. In an apparatus for the purpose described, the combination of a tank adapted to contain a cooling agent, and having an opening in its side wall, and a sight-glass arranged over said opening, a receptacle arranged in the tank, and having an opening in its side wall, registered with that of the tank, and a flange resting over the lower wall of said opening of the tank, and a cooler removably arranged in the upper portion of the receptacle, and comprising a hollow, cone-shaped body, having an opening in its top, a removable, cone-shaped cover arranged over said opening, and arms extending upwardly from the body, and having hooks engaging the upper end of the receptacle.

In testimony whereof I have hereunto set my hand in presence of two subscribing witnesses.

JOSEPH KLEIN.

Witnesses:
 CHAS. N. SCHURCH,
 C. G. MATZEN.